Feb. 7, 1933.  E. C. O'DONNELL  1,896,495
SIGNAL DEVICE FOR VEHICLES
Filed May 6, 1930  3 Sheets-Sheet 1
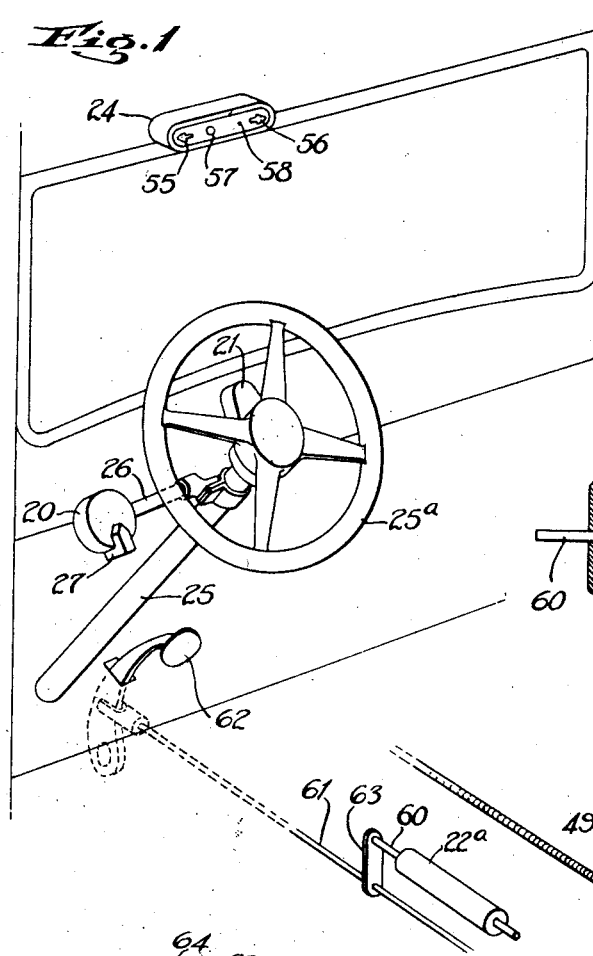
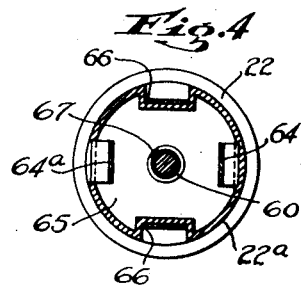
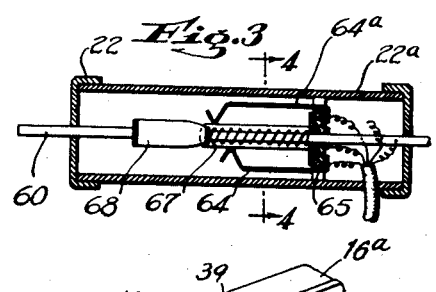
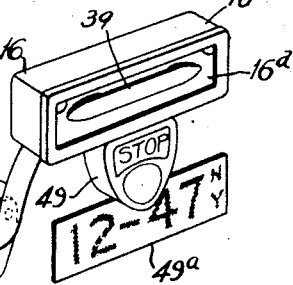
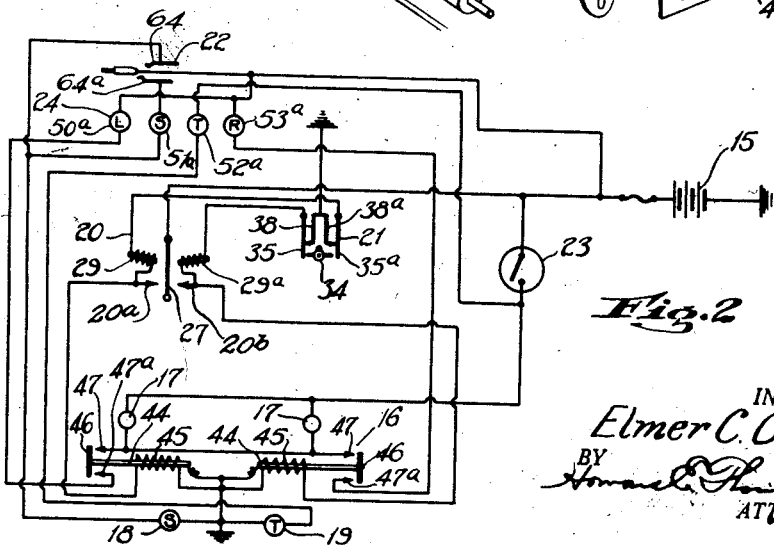
INVENTOR.
Elmer C. O'Donnell
BY
ATTORNEY Feb. 7, 1933.   E. C. O'DONNELL   1,896,495
SIGNAL DEVICE FOR VEHICLES
Filed May 6, 1930    3 Sheets-Sheet 2
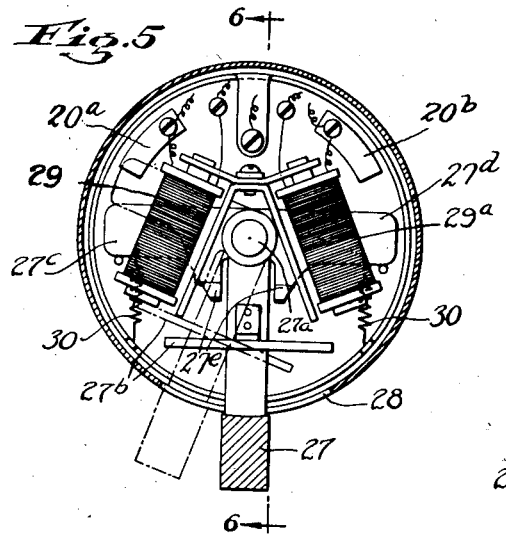
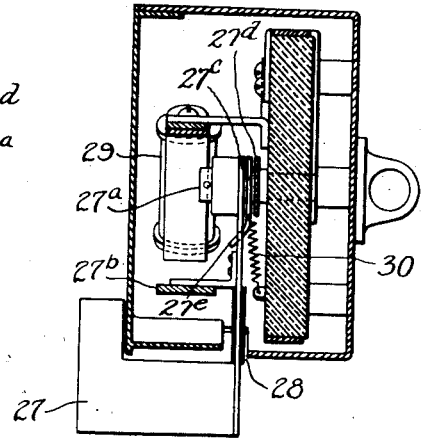
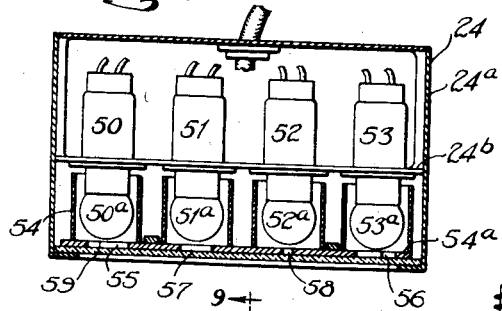
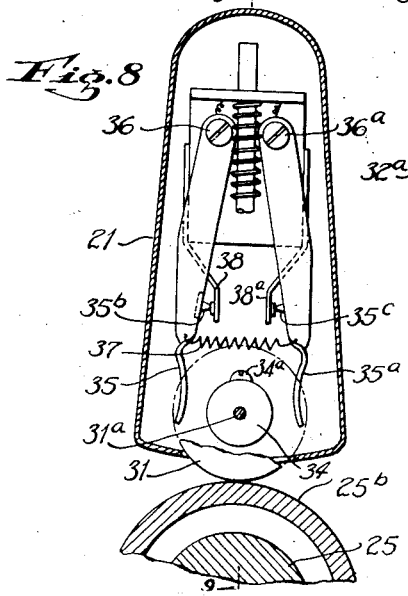
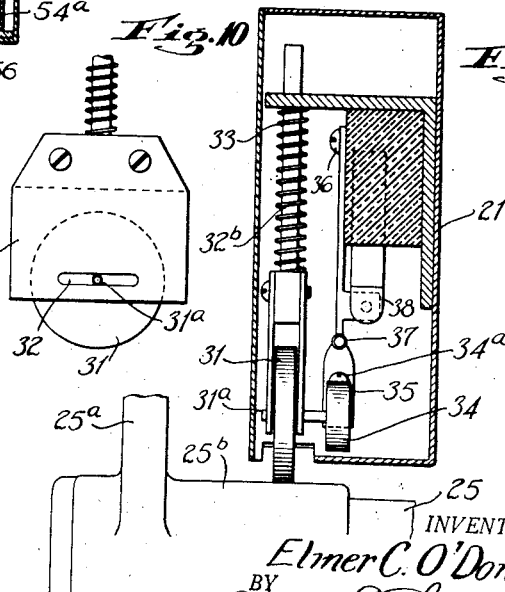
INVENTOR.
Elmer C. O'Donnell
BY
ATTORNEY Feb. 7, 1933.   E. C. O'DONNELL   1,896,495
SIGNAL DEVICE FOR VEHICLES
Filed May 6, 1930   3 Sheets-Sheet 3

INVENTOR.
Elmer C. O'Donnell
BY
ATTORNEY

Patented Feb. 7, 1933

1,896,495

UNITED STATES PATENT OFFICE

ELMER C. O'DONNELL, OF NEW YORK, N. Y.

SIGNAL DEVICE FOR VEHICLES

Application filed May 6, 1930. Serial No. 450,092.

This invention relates to signal devices for vehicles and particularly such vehicles as buses, trucks, pleasure cars and the like; and the object of the invention is to provide a vehicle of the class specified with a signal box arranged in such position on the vehicle as to be visible at the rear of the vehicle, with signal means in said box, the actuation of which is controlled by the operator of the vehicle for indicating the direction at which the vehicle is about to turn, the nature of said signal being such as to be clearly visible both night and day; a further object being to provide in my improved signal circuit the stop and tail light signals commonly employed on motor vehicles; a still further object being to provide means disposed in the driver's compartment and visible to the driver for indicating the successful operation of the several signal devices; a further object being to provide a turn signal of the class specified which is manually moved into operative position and automatically moved into inoperative position, the latter control being governed by a device arranged to cooperate with the steering means of the vehicle; and with these and other objects in view, the invention consists in a signal device of the class and for the purpose specified which is simple in construction, efficient in use and which is constructed as hereinafter described and claimed.

The invention is fully disclosed in the following specification, of which the accompanying drawings form a part, in which the separate parts of my improvement are designated by suitable reference characters in each of the views, and in which:

Fig. 1 is a diagrammatic perspective view showing the general arrangement of the several devices of my improved signal.

Fig. 2 is a diagrammatic view of the circuits to the respective devices which I employ.

Fig. 3 is a sectional, detail view of a stop light switch.

Fig. 4 is a transverse section on the line 4—4 of Fig. 3.

Fig. 5 is a sectional plan view of a turn signal switch which I employ.

Fig. 6 is a section on the line 6—6 of Fig. 5.

Fig. 7 is a sectional plan view of a signal indicator.

Fig. 8 is a sectional, detail view of an automatic switch which I employ.

Fig. 9 is a section on the line 9—9 of Fig. 8.

Fig. 10 is a detail plan view of a part of the structure shown in Figs. 8 and 9.

Figure 11:
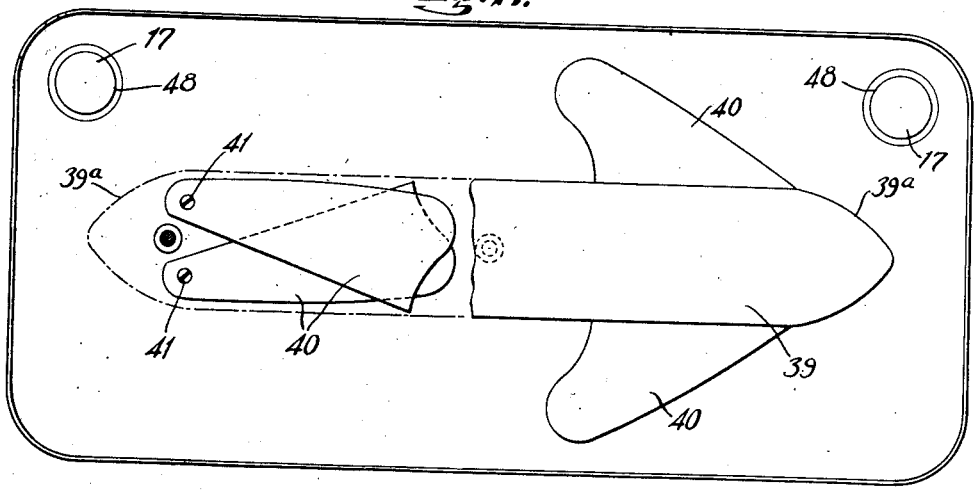
Fig. 11 is a face view of the turn signal which I employ with the cover thereof removed.

For the purpose of illustrating one use of my invention I have shown one method of applying the same to a motor vehicle and in Fig. 2 of the drawings I have diagrammatically illustrated the electric circuit to the several units of the device. In said figure, 15 represents the battery or source of electric supply and what is known as a ground circuit commonly employed on vehicle of the class under consideration. At 16, I have indicated the daylight turn signal which may be illuminated by bulbs 17. At 18, I have indicated the stop signal, and at 19, the tail light signal, at 20 the manually operated switch controlling the turn signal and at 21 the automatic switch working in conjunction with the switch 20 to control said turn signal, and at 22 the switch device controlling the stop signal. At 23 I have shown the manual switch for controlling the tail light 19 as well as the bulbs 17 of the signal 16, and at 24, I have shown the signal indicator which I employ.

The switch 20 is arranged in a casing which is preferably supported upon the steering post 25 within the driver's seat compartment by means of a bracket 26 as indicated in Fig. 1 of the drawings, and this switch has an arm 27 arranged externally of its casing and mounted to swing on a pivot 27a, the projecting end of the arm 27 operated in an elongated slot 28 in the casing of the switch.

Arranged in the casing are two electromagnets 29 and 29a in connection with one pole of each of which the contact 27b on the arm 27 is adapted to engage, said arm cooperating with either one of two levers 27c and 27d through projecting fingers 27e thereon. To the side extensions of the levers 27c and 27d are connected springs 30 which serve to normally maintain the switch arm 27 in the position shown in full lines in Fig. 5 of the drawings, the arm being held in engagement with the magnets 29 and 29a against the action of said springs when the current is passing therethrough. The instant the circuit is broken, the switch arm 27 will automatically move into its neutral position shown in full lines in Fig. 5, and the lever will return to normal position. It will be noted that the levers 27c and 27d are adapted to engage contacts 20a and 20b in the casing of the switch 20 to complete the circuit to the contact 47a.

The automatic switch 21 is arranged in a casing supported in connection with the steering post 25 adjacent the wheel 25a and comprises a friction roller 31 adapted to operate in connection with the sleeve portion 25b of the wheel 25a, note Fig. 9. The shaft 31a of the roller 31 operates in elongated slots 32 in guide plates 32a arranged in the casing of said switch upon a plunger rod 32b, a coil spring 33 being employed on said rod and serving to support the wheel in firm engagement with the sleeve 25b. On the shaft 31a is a cam wheel 34, the raised portion 34a of which is adapted to cooperate with either one of two contact arms 35 and 35a pivoted to an insulated block arranged in the casing of the switch as seen at 36—36a, the free end portions of said arms being coupled together by a spring 37 normally supporting contact points 35b and 35c of said arms in engagement with corresponding contacts on stationary arms 38 and 38a. The raised portion 34a serves to direct the circuit through the contacts 35b and 35c.

It will be understood that in the operation of the automatic switch the rotation of the steering wheel 25a will cause the friction wheel 31 together with the cam 34 to move to the left or to the right in the slot 32 to bring said cam into position to engage the contact arm 35 or 35a. The direction of movement is controlled by the direction of rotation of said steering wheel.

Figure 12:
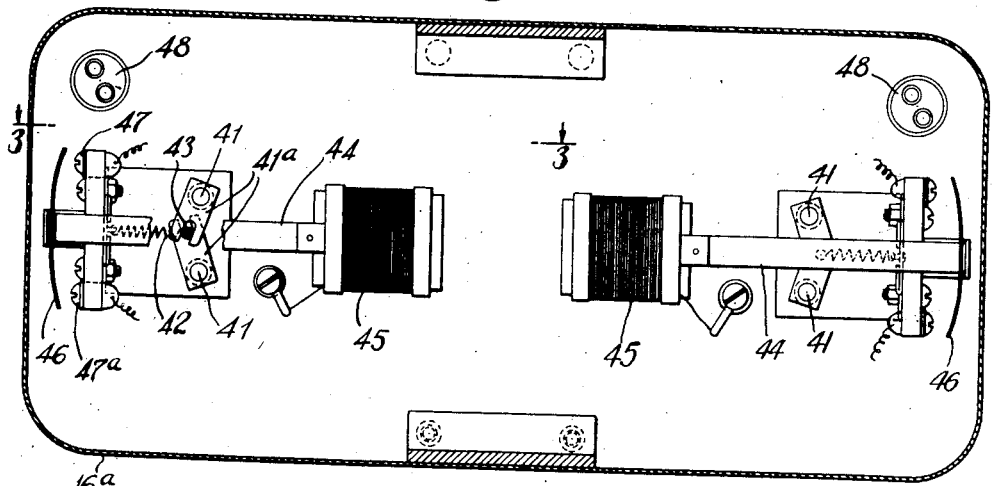
Fig. 12 is a longitudinal, sectional view through the device shown in Fig. 11.
Figure 13:
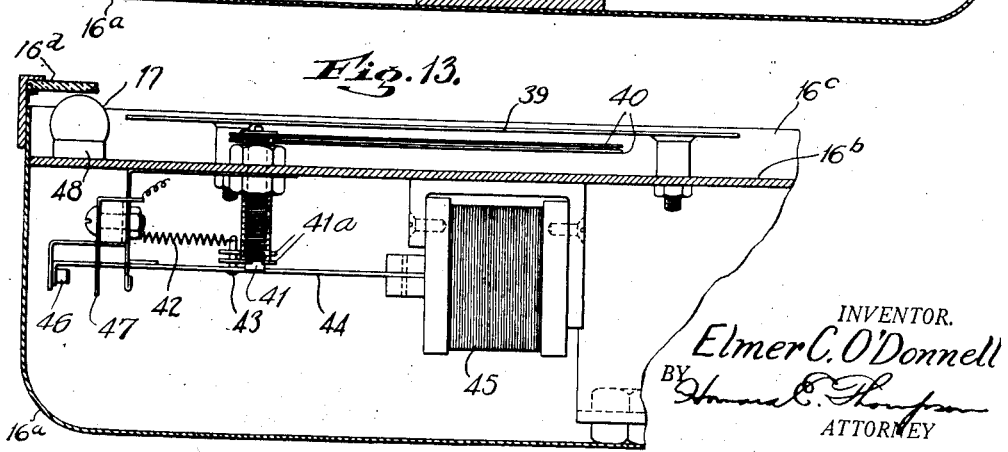
Fig. 13 is a partial section on the line 3—3 of Fig. 12.

The direction signal 16 is shown in detail in Figs. 11, 12 and 13 and comprises a casing 16a divided at its outer end by a partition wall 16b outwardly of which is arranged a direction indicating bar 39, the outer face of which is colored white, or the entire bar may be composed of a white or light material of any kind or class. The ends of the bar 39 are rounded as indicated at 39a, note Fig. 11 and pivotally supported at the ends of the bar are laterally movable wings 40, the pivots of which are shown at 41. These wings when extended as indicated at the right of Fig. 11 form an arrow head indicating the direction at which the vehicle is about to turn; and the outer faces of said wings 40 are light in color or may be constructed of a material of such color. The wings 40 are normally retained in collapsed position as indicated at the left of Fig. 11 of the drawings by springs 42 coupled with pins 43 arranged on a movable core 44 of solenoids 45, the pins 43 engaging slotted arms 41a on the pivots 41 of the wings 40. The free ends of the cores 44 of the solenoids carry contact plates 46 adapted to cooperate with spaced contacts 47—47a supported in the casing 16a.

The partition 16b forms a chamber 16c in the casing within which the signal bar 39 and wings 40 are arranged which is closed by a transparent cover 16d. Arranged in the upper corners of the chambers 16c are sockets 48 for electric bulbs 17 employed to illuminate the direction signal formed by the bar 39 and wings 40 in night driving, said bulbs being put into operation only when the direction signal is operated, it being understood that the bulbs 17 are not illuminated when driving in daylight.

At the lower end of the casing 16a is supported a casing 49 in which are arranged the stop light 18 and tail light 19, and if desired, the casing 49 will constitute a part of the casing 16a, and in some uses, the casing 16a may be entirely apart from the casing 49, the license plate 49a being suspended from the lower end of the casing 49. It will also be noted that in Fig. 1 of the drawings I have shown at 49b the bracket for supporting the casing 16a in connection with the vehicle, it being understood that any type of bracket may be employed.

The signal indicator 24 is shown in detail in Fig. 7 of the drawings and comprises a casing 24a having a partition wall 24b in connection with which a plurality of lamp sockets 50, 51, 52 and 53 are supported whereby electric bulbs may be coupled with said sockets, the bulbs being indicated at 50a, 51a, 52a and 53a.

These bulbs are all enclosed in shields 54 for directing the light onto independent signals 55, 56, 57 and 58 formed by cut outs on an opaque sheet 54a arranged within the casing rearwardly of a translucent panel 59 preferably of a dark blue or purplish color so as to give a faint but clear signal light on the indicator.

Upon a consideration of Fig. 1 of the drawings, it will be seen that the cut outs 55 and 56 show representations of arrows to indicate and check the respective turn signals whereas the cut out 57 has a relatively large aperture and the cut out 58 a very small aperture, the latter controlling the tail light whereas the cut out 57 controls the stop light. By virtue of this indicator, the proper functioning of the several signal devices may be known at all times in that the bulbs 50a, 51a, 52a and 53a are all in operative engagement with the circuit controlling operation of the wings 40 of the turn signal and the stop light 18 and tail light 19.

The stop light switch 22 is arranged in a casing 22a shown in detail in Figs. 3 and 4 of the drawings, said switch comprising a plunger 60 coupled with the brake rod 61 of the foot brake 62 of the vehicle through a link 63, note Fig. 1, the plunger 60 being adapted to complete the circuit through two spring contacts 64 and 64a arranged in the casing 22a, said contacts being supported on a block of insulating material 65 keyed to the casing as seen at 66, note Fig. 4.

The plunger 60 is movable through said block in the completion of the circuit, the latter movement being performed against the action of a coil spring 67 disposed between the contact surface 68 on the plunger and the block 65. The circuit to the several units of my improved signal is clearly shown in Fig. 2 of the drawings, and upon tracing these circuits, it will be found that the current from the battery 15 leads to the pivot of the switch arm 27 and extends through either of the electromagnets 29—29a and also through either of the solenoids 45, at which point the circuit is grounded. The action of either of the movable cores 44 of the solenoids will complete the circuit through the contacts 47—47a thereof, which closes the circuit through either of the bulbs 50a—53a and also the circuit through both of the bulbs 17, if the switch 23 is closed and both of the last named circuits are grounded through the core of the solenoid which is actuated. It will be understood that if the switch 23 is opened, the bulbs 17 will not be illuminated. The bulbs of the stop light 18 and tail light 19 are in series with the bulbs 51a—52a respectively, the bulbs 18 and 51a being controlled through the switch 22, whereas the bulbs 19 and 52a are controlled through the switch 23. It will be noted that the circuit passing through the coil of the electromagnets 29—29a extends to the arm 35a and 35 respectively of the automatic switch.

It will therefore be seen that if the vehicle is to be turned to the right, the switch arm 27 is moved to the right to close the circuit through the electromagnet 29a. This circuit is held closed by the completion of the circuit through the contacts 35b of the arm 35, and the adjacent contact 38, whereas during the turning progress of the vehicle, the circuit is broken through the contact 35c of the arm 35a and the adjacent arm 38a. In returning the vehicle to a straight forward drive position, the operation of the steering wheel to the left will move the cam block 34 and its cam surface 34a into engagement with the contact arm 35 to break the circuit between the contact 35b and the contact 38 thus breaking the circuit to the electro-magnet 29a, releasing the arm 27 as well as the solenoid 44, operating the right hand wings 40 causing said wings to be moved by the spring 42 thereof into inoperative or concealed position. The same result will be accomplished in turning the vehicle to the left, and it will be understood at this time that while I have shown one method of closing and opening the signal circuit, my invention is not necessarily limited to the details of construction of the switch herein shown and described.

It will be understood that while operating the vehicle during the day, the switch 23 is maintained in open circuit position and as the vehicle is turned from the left to the right and the switch arm 27 moved by the operator to the left or right to indicate the left or right hand turn, the wings 40 of the indicator bar 39 at the left or right thereof will be moved into operative position and may be readily seen at a comparatively great distance from the rear of the vehicle to clearly indicate the direction at which the vehicle is about to turn. This operation may be performed while approaching a street or road intersection into which the vehicle is about to turn, a sufficient time in advance of actually making the turn, to give the driver of the following vehicle due signal warning of the direction of progress to be made.

When driving at night, the bulbs 17 will be placed in operation through the switch 23 to illuminate the chamber 16c and the direction indicator therein. At all times, the operator will be advised as to the proper functioning of the wings 40 by virtue of the indicator signals 55–56 and in like manner, the proper functioning of the stop light will be visible by the signal 57 and the functioning of the tail light indicated at 58.

It will be apparent that while I have shown one form of construction for carrying my invention into effect and have illustrated a specific arrangement of the parts, that the switches 20 and 21 may be placed at any desired position on the vehicle, the switch 20 being preferably within reach of the operator. In like manner, the indicator 24 may be arranged in different places within the driver's compartment of the vehicle and various other changes in and modifications of the structural details herein shown and described may be made within the scope of the appended claims without departing from the spirit of my invention or sacrificing its advantages.

Having fully described my invention, what I claim as new and desire to secure by Letters Patent, is:

1. The combination with a motor vehicle, of a turn signal adapted to be arranged on the vehicle to be visible from the rear thereof, said signal comprising a casing, open at one side, an elongated, pointed, flat, bar-like signal element arranged in said casing and visible in daylight without illumination, means in said casing for illuminating said element at night, other signal elements arranged rearwardly of and adjacent each end of the first named element, said last named elements comprising independently supported pivoted and movable members normally arranged in overlapping relation with respect to each other and concealed behind the first named signal element, and means for moving said members into position to project at opposite side edges of said element to form in conjunction therewith arrow shaped means indicating the direction in which a vehicle is about to turn.

2. In a signal device for motor vehicles, the combination with a signal bar arranged in and visible through an open side of a casing, of other signal elements arranged rearwardly of and within the boundaries of one end of said bar and comprising independently supported movable elements normally concealed beyond said bar, and manually controlled means for moving said elements into position to project at opposite sides of the bar to form in conjunction therewith arrow-shaped means indicating one direction in which a vehicle is about to turn.

3. The combination with a motor vehicle, of a turn signal comprising a casing open at one side, an elongated bar-like signal member arranged in said casing and clearly visible through the open side thereof, independently supported movable signal elements normally arranged behind and within the boundaries of the end portions only of said member, means in the casing rearwardly of and adjacent each end of said member for illuminating said member and elements, and means for operating said elements into position to project at opposite side edges of said member to form in conjunction therewith arrow-shaped means indicating the direction in which a vehicle is about to turn.

In testimony that I claim the foregoing as my invention I have signed my name this 24th day of April, 1930.

ELMER C. O'DONNELL.